US010537760B2

(12) United States Patent
Barz

(10) Patent No.: US 10,537,760 B2
(45) Date of Patent: Jan. 21, 2020

(54) FLAME-GUARD FILTER COMPOSED OF A NUMBER OF LAYER SEQUENCES, AND ARRANGEMENTS OF FLAME-GUARD FILTERS AND THEIR USE

(71) Applicant: R. STAHL SCHALTGERAETE GMBH, Waldenburg (DE)

(72) Inventor: Ines Barz, Apolda (DE)

(73) Assignee: R. STAHL SCHALTGERAETE GMBH, Waldenburg (DE)

( * ) Notice: Subject to any disclaimer, the term of this patent is extended or adjusted under 35 U.S.C. 154(b) by 238 days.

(21) Appl. No.: 15/524,688

(22) PCT Filed: Nov. 5, 2015

(86) PCT No.: PCT/DE2015/100471
§ 371 (c)(1),
(2) Date: May 5, 2017

(87) PCT Pub. No.: WO2016/070874
PCT Pub. Date: May 12, 2016

(65) Prior Publication Data
US 2017/0319881 A1 Nov. 9, 2017

(30) Foreign Application Priority Data
Nov. 6, 2014 (DE) .................. 10 2014 116 149

(51) Int. Cl.
*A62C 4/00* (2006.01)
*B01D 46/12* (2006.01)
*B01D 39/12* (2006.01)

(52) U.S. Cl.
CPC ............. *A62C 4/00* (2013.01); *B01D 39/12* (2013.01); *B01D 46/12* (2013.01)

(58) Field of Classification Search
CPC .... A62C 4/00; A62C 4/02; A62C 4/04; B01D 46/12; B01D 39/12
See application file for complete search history.

(56) References Cited

U.S. PATENT DOCUMENTS

| 5,165,484 A | 11/1992 | Chaput |
| 6,978,845 B2 | 12/2005 | Leinemann |
| 2013/0206759 A1 | 8/2013 | Wuerz et al. |

FOREIGN PATENT DOCUMENTS

| AT | 132793 B | 4/1933 |
| CN | 1209345 A | 3/1999 |

(Continued)

*Primary Examiner* — Robert Clemente
(74) *Attorney, Agent, or Firm* — Abel Schillinger, LLP

(57) ABSTRACT

The invention relates to flame protection filters (F) consisting of a number of layer sequences (S1, S2, S3), wherein each of the layer sequences (S1, S2, S3) consists of filter layers (1, 2) arranged one on top of the other. Every layer sequence (S1, S2, S3) consists of a first filter layer (1) and a second filter layer (2) made from a material arranged in the shape of a grating with openings (1.1, 2.1) having an opening width (1.11, 2.11) in each instance. The first filter layer (1) having a free lateral surface (6.3) is a first end filter layer (3) with a first end filter opening width (3.11) and the second filter layer (2) having a free lateral surface (6.4) is a second end filter layer (4) with a second end filter opening width (4.11). The second opening width (2.11) of a second filter layer (2) is smaller than the first opening width (1.11) of a first filter layer (1). The second filter layer (2) is opaque. The invention further relates to an arrangement (10) of at least two flame protection filters (F1, F2) and a housing (9) which is encapsulated in a pressure-tight manner and with at least one flame protection filter (F, F1, F2).

20 Claims, 7 Drawing Sheets

(56) References Cited

FOREIGN PATENT DOCUMENTS

| | | |
|---|---|---|
| DE | 19826911 A1 | 1/2000 |
| DE | 202011050194 U1 | 7/2011 |
| DE | 102010016782 A1 | 11/2011 |
| EP | 0375455 A2 | 6/1990 |
| EP | 1081493 A1 | 3/2001 |
| EP | 1240923 B1 | 9/2002 |
| GB | 2464155 A | 4/2010 |

FLAME-GUARD FILTER COMPOSED OF A NUMBER OF LAYER SEQUENCES, AND ARRANGEMENTS OF FLAME-GUARD FILTERS AND THEIR USE

BACKGROUND OF THE INVENTION

1. Field of the Invention

The invention relates to a flame protection filter such as is known generically from DE 20 2011 050 194 UI. The invention is further directed to arrangements of at least two flame protection filters, uses of flame protection filters and arrangements and pressure-tight housing with at least one flame protection filter.

2. Discussion of Background Information

In various technical plants, explosion gases, gas mixtures and/or mists (aerosols) can accumulate undesirably in a localized manner. When these are ignited, a flame usually also occurs in addition to a rapidly rising explosion pressure. Owing to a flame of this type or even as a result of increased temperatures of components to which thermal energy is transmitted through an ignition or explosion, consecutive reactions such as subsequent ignitions can come about in other areas of the plant in question.

Electrical operating means are protected against explosions in at-risk areas of plants of this type where ignitable materials or mixtures of materials can occur in explosive concentrations. Housings used for this purpose are considered to be encapsulated in a pressure-tight manner so as to be protected against explosions when any explosions which may occur in the interior of the housing do not lead to ignitions outside of the housing and when the housings withstand at least one explosion with an anticipated progression and peak values of the pressure ratios.

It is also possible to avoid elevated pressure values in the housing through suitable technical measures. For example, such measures can consist in forming gaps, movable closure means and/or filter arrangements through which a proportion of the explosion gases which occur and/or have occurred can exit from the housing.

Therefore, when designing plants where there is a risk of explosions, it must be ensured in particular that when there is an explosion an increase in pressure caused by the explosion is attenuated such that there is no inadvertent damage to parts of the plant or injury to humans or animals in the vicinity of the plant at risk of explosion. Further, occurring flames should be safely extinguished before they can escape from an explosion-protected area of the plant. At the same time, it must be ensured that outwardly facing surfaces of the explosion-protected housing cannot be heated by the explosion and by thermal conduction to the extent that an ignition can occur anew outside of the explosion-protected area as a result of heating of this kind. By preventing the escape of flames and as a result of a sufficient cooling of the escaping (explosion) gas and by preventing heating of outer surfaces above a permissible temperature, a so-called ignition flashover or ignition transmission is inhibited.

Special requirements for the design of explosion-protected housings exist when moving components, for example, rotating shafts, must be guided through at least one wall of the housing.

DE 198 26 911 C2 describes a method for managing explosion gases occurring in the interior of an explosion-protected housing. A shaft sealing gap is formed around a shaft for guiding the shaft out of the interior of the housing. In case of an explosion, an ignition transmission is prevented by limiting the amount of explosion gases entering into the gap. A limiting of this kind is produced by flow dividers arranged in the interior of the housing or by a large-area distribution of explosion gases passing through the gap or specific flow resistances, or the cooling of explosion gases passing through the gap is achieved by means of bodies which are completely or partially permeable to gas and which have a cooling effect. The above-mentioned steps may also be combined. Further, relief orifices provided with flame barriers can be provided. Relief orifices of this kind are closed with porous material having good thermal conductivity. Gas can exit through the relief orifices and the occurrence of unwanted pressure peaks can accordingly be prevented or at least temporally limited.

Another possibility for preventing ignition transmission is described in EP 1 081 493 A1. For this purpose, a housing cover is formed by a flame protection filter comprising nonwoven metal fabric and an outer protective grating which is arranged on the nonwoven metal fabric. The nonwoven metal fabric is produced from metal fibers with thicknesses of up to 100 μm which are layered to form a random web, sintered and rolled. The nonwoven metal fabric has a close pore size distribution and, at the same time, high permeability. While the outer supporting grating serves to ensure and maintain the mechanical stability of the flame protection filter, an impinging flame front is separated from the pressure wave of the explosion and cooled by turbulences and by intensive contact with the metal fibers of the nonwoven metal fabric. An inner supporting grating can be incorporated in the nonwoven metal fabric and, further, can have a different mesh width than the outer supporting grating.

EP 1 240 923 B1 discloses a flame barrier component (hereinafter designated as flame protection filter or, for the sake of brevity, as protective filter or merely as filter) which has, as a flame barrier element, a winding of alternately arranged smooth and corrugated strips. The strips have a width of approximately 10 mm so that every flame barrier element has a thickness of at least 10 mm. Because of the corrugated strip, the flame barrier element has mesh widths of between 0.1 mm and 1.5 mm. Spacer elements are arranged on the flame barrier element in each instance so as to ensure an intermediate space between adjacent flame barrier elements. The spacer elements can be formed by metal bars but can also be formed of a metal grating or a woven metal fabric. In every case, the spacer elements are fixedly connected, at least at points, to a flame barrier element in each instance, particularly by welding. A plurality of sequences of flame barrier elements and spacer elements are arranged in a flame barrier component. Due to the fact that the spacer elements are fixedly connected in each instance to a flame barrier element, a high level of stability of the entire flame barrier component is ensured even when high forces act on the flame barrier elements due to the explosion pressure. The long distances to be covered by an explosion gas when passing through a flame barrier component of this type and the turbulences occurring in the intermediate spaces and cooling through heat conduction and heat transmission to the flame barrier elements ensure a pressure relief while simultaneously protecting against a flame transmission. A drawback to this solution is the required long construction length of the flame barrier component.

A pressure relief device for an explosion-protected housing according to DE 10 2010 016 782 A1 has a porous body with a pore closure at its periphery in order to prevent a lateral transition of the flame protection filter formed in this way through flames or hot gases. The porous body can comprise a plurality of gratings arranged one above the other among other things. The gratings in turn can be made of metal or other temperature-resistant materials and can have disparate mesh widths.

A quantity of individual flame protection elements (hereinafter designated as filter layers) in the form of metallic gratings of different mesh widths for pressure relief and for preventing a flame transmission are described in a pressure relief device according to the above-cited DE 20 2011 050 194 U1. For this purpose, a plurality of layers of woven metal fabrics are arranged one above the other to form flame arrestors (hereinafter: flame protection filters). In the event of an explosion, an explosion gas flows through the flame protection filter in a relief direction. In this respect, the mesh structures (hereinafter: mesh widths) of the filter layers are selected so as to become smaller in the relief direction. The explosion gas flowing through the flame protection filter in relief direction is increasingly swirled and enters into contact with the increasing surface of the filter layers having the smaller mesh widths and cools down. As a result of the low flow loss of the flame protection filter, an efficient pressure relief is ensured at the same time. In addition, closure means are arranged upstream of the quantity of filter layers, the effect of which is to prevent gases, mists or liquids from entering the flame protection filter from the outside. The closure means are opened when elevated pressures occur, for example, during explosions.

In general, the requirements set for pressure relief devices can be summarized as follows: reduction of an elevated gas pressure occurring in an interior of a housing, prevention of an ignition transmission, complying with the required maximum permissible surface temperatures particularly on the outer surfaces of the housing and flame protection filter, ensuring the necessary mechanical stability under load, and durability over a number of load incidents (a plurality of explosion events).

In the solutions known from the prior art, either materials which are comparatively expensive to produce are used as component parts of flame protection filters or long structural lengths of the flame protection filters are required to ensure sufficient safeguarding against an ignition transmission. However, long structural lengths limit the possibilities for using flame protection filters of this kind and, in addition to a large space requirement, also necessitate an increased use of material.

SUMMARY OF THE INVENTION

The object of the invention is to suggest a flame protection filter which offers a high degree of protection against ignition transmission with a minimal structural length.

This object is met by a flame protection filter comprising a quantity k of layer sequences, where k=1, . . . , n, and each layer sequence comprises filter layers arranged one on top of the other. A flame protection filter according to the invention is characterized in that every layer sequence is formed of a first filter layer and a second filter layer parallel to the latter. Each of the filter layers is made from a material arranged in the shape of a grating.

The first grating of the first filter layer has openings each with a first opening width and the second grating of the second filter layer has openings each with a second opening width. The second opening width is smaller than the first opening width in each instance. The second filter layer is opaque, i.e., an imaginary perpendicular projection of the second filter layer on a projection plane extending parallel thereto gives a closed surface area. In contrast, an imaginary perpendicular projection of the first filter layer on the projection plane extending parallel thereto gives a lattice structure.

The core of the invention is the construction of a flame protection filter from a quantity of layer sequences, wherein the smallest flame protection filter only comprises a first filter layer and a second filter layer. This construction of the flame protection filter, according to the invention, from layer sequences as individual units advantageously allows a modular configuration and makes it possible to adapt flame protection filters to given conditions of use and technical requirements. Further, additional configurations such as the arrangement of further filter layers on or at a flame protection filter according to the invention are possible.

The first filter layer and second filter layer which form a termination of a flame protection filter according to the invention and which therefore have three lateral surfaces are defined as first end filter layer and second end filter layer, respectively. The openings of these end filter layers are designated as end filter openings and have an end filter opening width in each instance.

In other possibilities for constructing the flame protection filter according to the invention, a first end filter layer and/or second end filter layer of a flame protection filter according to the invention is covered by a further filter layer, which does nothing to alter the original assertion that the filter layer in question constitutes the first end filter layer or second end filter layer.

The first end filter opening width or second end filter opening width can deviate from the first opening width or second opening width of the flame protection filter.

The term "grating" means all arrangements of the respective material of a filter layer in which openings or end filter openings are provided and are separated by webs of the respective material. Therefore, gratings can be regular structures which, for example, are formed by wires or bars arranged parallel to one another as is known from wire mesh, for example. In other embodiments, they may also be formed by perforated materials. For example, materials can be perforated by means of high-energy radiation (e.g., lasers) or by means of mechanical tools. In further embodiments, the gratings can also be formed during the production of the filter layers. For example, gratings may be formed of pre-shaped material which is subsequently sintered and used as filter layers.

In further embodiments, the gratings may also have openings or end filter openings which are arranged in an irregular manner.

Any shape of opening can be selected. This shape may vary between the filter layers and within a filter layer.

In a construction that is very advantageous because it can be produced inexpensively, the first filter layers and the first end filter layer are produced from woven wire fabric.

In preferred embodiments of the flame protection filter according the invention, the second filter layers and the second end filter layer are formed by woven wire fabrics in the form of braids which are opaque.

The opening widths and end filter opening widths are determined by the clear widths of the openings and end filter openings. In case of regularly structured filter layers, e.g., in woven wire fabrics, a mean opening width and a mean end filter opening width can easily be measured and specified as opening width and end filter opening width while taking manufacturing tolerances into account. Further, it is possible to determine the opening widths and end filter opening widths through testing procedures in which test bodies of a known size distribution are sieved through the filter layer. The dimensions of the largest test bodies which can be sieved through the respective filter layer show the opening width and end filter opening width. The test known as the gas bubble test or capillary pressure method (bubble point test) can also be used (DIN ISO 4003/1977).

It is advantageous when the distribution of the values of the opening width and end filter opening width is as small as possible so as to be able to reliably estimate the fluidic characteristics of the respective filter layers and their capacity for extinguishing flames and so as to ensure similar effects of layer sequences which have been produced with the same construction.

The number of openings and end filter openings per area unit is defined by the opening width or end filter opening width and by the width of the webs between the openings and end filter openings.

A second filter layer is opaque within the meaning of the present description if the webs of the filter layer are spaced close enough apart from one another and/or the webs are arranged in different planes of the filter layer so as to be offset with respect to one another such that the flow direction of a gas flow which impinges substantially perpendicularly on the filter layer is compulsorily deflected. This means that it would not be possible for a person to resolve contours of objects located behind the second filter layer through the second filter layer with the naked eye from a maximum viewing distance of 1 m, preferably from a viewing distance of 0.25 m. Therefore, the webs are preferably spaced close enough apart from one another and/or are arranged so as to be offset with respect to one another in different planes of the filter layer such that light beams cannot pass through the second filter layer along a straight line, but rather are diffracted and/or reflected when impinging on the second filter layer.

In a refining configuration of the flame protection filter according to the invention, a quantity n>1, but at least two (n=2), layer sequences are arranged. Therefore, there are at least a first end filter layer and a second end filter layer and n−1 first filter layers and n−1 second filter layers. The first end filter opening width preferably differs from the first opening width. The first end filter opening width can be greater than the first opening width, for example.

Further, it is possible that the second end filter layer and/or the first filter layer is coated with a further filter layer comprising a material arranged in the shape of a grating, and the grating has openings with a further opening width which can be equal to or greater than the second opening width and the second end filter opening width. In an advantageous construction, the further opening width is equal to the first end filter opening width. A flame protection filter of this kind is covered on both sides by gratings of larger opening widths or end filter opening widths and is accordingly additionally mechanically stabilized and protected.

The material of the filter layers, of the further filter layer(s) and of the end filter layers are preferably temperature-resistant materials. These materials withstand thermal loading in the event of an explosion and advantageously allow repeated use of the flame protection filter according to the invention. The material is preferably selected from metals, metal alloys, plastics, ceramics or composite materials. Composite materials can be composites of the above-mentioned materials.

It has proven very advantageous when the grating of the second filter layer is a woven fabric in the form of a braid.

Woven fabrics are produced in different weaves. The most important basic types of weaves are the linen weave or plain weave (hereinafter designated as linen weave) and the twill weave. With the linen weave, a weft is guided alternately over and under a warp. With the twill weave, the weft is guided under a warp and then over at least two warps. This sequence is shifted in a constant direction by a warp in each instance through a subsequent weft. In the following, wefts are also designated as weft wires and warps are also designated as warp wires.

Braids are woven fabrics, particularly woven wire fabrics in connection with the description, in which weft wires are woven together with warp wires in a weft direction and in a warp direction, respectively. Braids are woven fabrics in which the warp wires are generally thicker than the weft wires. Further, the weft wires are generally so tightly layered together that a so-called tight mesh is formed. Within the meaning of the invention, woven fabrics having weft wires and warp wires which are spaced apart by at most 200 µm or, better, by at most 150 µm and preferably by at most 100 µm are also considered to be braids. The weft direction and the warp direction usually run orthogonal to one another. A variety of braids are distinguished from one another based on the weave and on the thicknesses and quantities of weft wires and warp wires. Common types of braid are the smooth braid, Dutch braid and shapes for particular uses such as for filtration of fluids, for example.

Filter layers of a flame protection filter according to the invention can comprise a plurality of plies of material. Accordingly, the above-mentioned braids are considered a second filter layer although the material thereof can be woven in a plurality of planes.

Flame protection filters according to the invention preferably have one or more second filter layers which are formed as a braid with linen weave or as a braid with twill weave. If a plurality of second filter layers are arranged in a flame protection filter, the braids of some of the second filter layers can be braids with linen weave and the braids of other second filter layers can be braids with twill weave.

If the flame protection filter according to the invention has a quantity n of existing layer sequences of n greater than 1, two second filter layers arranged adjacent to one and the same first filter layer can always advantageously be arranged so as to be offset with respect to one another. An offset arrangement of this kind further reduces the risk of an ignition transmission because there is no straight-line continuous path through the layer sequences for a flame transmission and a change in direction is forced upon incident explosion gases.

An advantageous offset of second filter layers of this kind can be carried out in that the second filter layers are arranged so as to be rotated relative to one another by an angle selected from an angular range of greater than 0º up to and including 90° and/or the second filter layers are arranged so as to be displaced by a distance relative to one another in a direction facing parallel to the lateral surfaces of the filter layers.

The second filter layers can be rotated alternately by an angle, for example, by 90°. It is also possible that the second filter layers are rotated in each instance by a smaller angular value, for example, 15°, 30°, 45°, 60° or 75°.

Flame protection filters according to the invention were produced, for example, from two layer sequences and a further filter layer and successfully tested in Class II C (EN 60079-0: 2011) for prevention of an ignition transmission. In this case, the selected further opening width was 2 mm and the selected first opening width was 400 µm.

Various flame protection filters of this type were successfully tested, wherein the smallest second opening width and the largest second opening width used were 150 µm and 315 µm, respectively.

The choice of the dimensions of the first opening widths, second opening widths and further opening widths in the direction of smaller values is limited only through practical considerations and requirements, for example, for maintaining a sufficient pressure relief.

If there are more than two layer sequences in a flame protection filter according to the invention, larger first opening widths, second opening widths and further opening widths are also flameproof. Larger first opening widths, second opening widths and further opening widths are possible for Classes II A and II B of the above-mentioned standard.

A plurality of flame protection filters according to the invention can also be arranged and used together. In a possible arrangement of at least two flame protection filters, the flame protection filters are arranged along a common axis extending perpendicular to the filter layers of the flame protection filters.

It is advantageous when the flame protection filters are arranged at a distance of less than 1 mm, advantageously 0.5 mm, 0.25 mm or 0.1 mm. A small distance between adjacently arranged flame protection filters reduces the risk of fire on or between the flame protection filters.

It is possible that at least two adjacently arranged flame protection filters directly contact one another. The directly contacting flame protection filters touch each other, for example, at their first end filter layers, at their second end filter layers, or at a first end filter layer and a second end filter layer. If a further filter layer is provided on a second end filter layer, direct contact can also be made between the further end filter layer and a first end filter layer, a second end filter layer or another further filter layer.

Flame protection filters preferably directly contact one another in an arrangement via first filter layers or via further filter layers which have a large first end filter opening width or further opening width of, for example, 1.0 mm and more, for example 1.5 mm, 2 mm or 2.5 mm.

Surprisingly, when adjacently arranged flame protection filters are in direct contact, it has proven advantageous when two opposing filter layers touch one another but this touching is limited to minimal contact surfaces which are formed by raised portions of the grating. A configuration of this type can make it possible for heat to be conducted—now in a reduced manner—through the minimized contact surfaces. At the same time, an explosion gas which flows through is offered a comparatively large volume through which to flow. Advantageously, an extensive cooling of the explosion gas is achieved when this explosion gas flows along the path through the mutually touching filter layers. This configuration of an arrangement with flame protection filters according to the invention prevents a flashover in a very reliable manner. Owing to the efficient cooling of the explosion gas, the temperature on the outwardly facing end filter layer during explosions in the housing can fall below the temperature of 80° C. permitted for temperature class T6 (EN 60079-0: 2001).

A particular advantage of flame protection filters according to the invention consists in that an ignition transmission is achieved along with an efficient pressure relief at the same time. Further, the use of comparatively inexpensive materials such as wire in filter layers in grating constructions which can likewise be produced inexpensively is made possible.

The flame protection filters according to the invention and arrangements thereof offer the great advantage of having low pressure loss coefficients. At the same time, the paths to be covered by a flame front through the flame protection filter are long so that a good cooling and reliable prevention of ignition transmission is achieved. Further, owing to the greater usable material thicknesses, the flame protection filter is highly stable vis-à-vis deformations during regular operation of the plants and in case of an explosion event or repeated explosion events.

The use of temperature-resistant materials and the possibility of using these materials with large dimensions, for example, with large wire diameters, allows type testing instead of time-consuming routine testing during quality control. The testing can be directed to the housing or to the flame protection filters.

For this purpose, the housing must withstand four-fold reference pressure. Otherwise, a routine testing with 1.5-fold reference pressure is required. If the reference pressure can be sufficiently reduced by the pressure relief, routine testing which would otherwise be necessary is dispensed with. Woven wire fabrics are geometrically defined. Dimensional stability is high. This results in a substantially reduced expenditure on testing.

The flame protection filters according to the invention and the arrangements of flame protection filters according to the invention can be provided for a range of technical uses. A flame protection filter or an arrangement can be used for preventing an ignition transmission and for pressure relief after an increase in gas pressure.

An increase in gas pressure of this kind takes place, for example, as a result of an explosion. During an explosion, a pressure wave impinges on the flame protection filter and on the arrangement, where a local pressure increase is brought about. If the explosion takes place in the interior of a housing, the gas pressure increases in the entire interior. During an explosion, owing to the construction of the flame protection filter in accordance with the invention, a front of an occurring pressure wave is separated from an occurring flame front. In so doing, the occurring pressure wave is relieved toward the outside of the housing, while the subsequent flame front does not pass through the flame protection filter.

A corresponding structural configuration of the flame protection filter is required in order to ensure maximum permissible temperatures of the outer surfaces of the flame protection filter according to the invention. The maximum permissible temperature can be adhered to through the selection of the thickness of the flame protection filter, particularly through the choice of the quantity n of layer sequences. If only a small relief surface can be realized in a housing, an arrangement of flame protection filters can be used.

The combination, according to the invention, of different first filter layers and second filter layers makes it possible to achieve a combination of relief structure, filter structure and supporting structure for preventing an ignition transmission and an extensive mechanical stability of the flame protection filter and a maximum pressure relief at the same time.

For specific applications, flame protection filters according to the invention can be specifically composed of layer sequences, and the first filter layer and second filter layer of the layer sequences may be selected individually with respect to the material utilized in each instance and with respect to the opening widths. Further, the characteristics of the flame protection filter with respect to preventing an ignition transmission and with respect to a possible pressure relief can be influenced by the positioning of, and possibly through an offset arrangement of, the second filter layers in particular.

A flame front is repeatedly deflected and diverted in a specific manner through the effect of the filter layers in the layer sequence or layer sequences of a flame protection filter according to the invention so that the flames are extinguished and the explosion gases are cooled. At the same time, a high gas flow through the flame protection filter is made possible so that an effective pressure relief takes place.

The flame protection filter according to the invention can be produced and used in small structural lengths. For example, it is possible to produce a flame protection filter comprising two layer sequences and a further filter layer with a structural length (thickness) of less than 4 mm. With a suitable choice of materials and opening widths or end filter opening widths, a pressure relief is combined with a reliable prevention of ignition transmission through an arrangement of two such flame protection filters with a structural length of the arrangement of less than 8 mm.

The flame protection filter according to the invention can have any cross-sectional areas and, for example, can be round, oval, triangular, rectangular or polygonal or can have an irregularly shaped cross-sectional area. It can be provided with a mount in order to fit the flame protection filter in an arrangement of flame protection filters, in a housing or in another holder.

Flame protection filters according to the invention can also be provided as integral component parts of devices, for example, of explosion-protected and/or pressure-relieved housings. For example, they can be fitted directly into a housing wall by bonding.

Further, the layer sequences can be designed as insert parts which can be inserted into a housing during the manufacture of the housing and overmolded, which allows a high precision in the manufacture of the housing and a secure sealing of the flame protection filter along its circumferential surface.

The first filter layer(s), second filter layer(s) and/or further layer(s) of a flame protection filter according to the invention and/or the quantity of layer sequences can be bonded to one another, for example, welded or sintered together. Further, the first filter layer(s), second filter layer(s) and/or further filter layer(s) are connected to one another by positive engagement in that they are held by screw connections or clamping connections, for example, or are arranged in suitably shaped holders.

In addition, at least one device for preventing a penetration of gaseous and/or solid substances and substance mixtures can be associated with flame protection filters according to the invention and arrangements of flame protection filters. Diaphragms, valves, plates or flaps can be provided as protective devices for preventing, for example, a penetration of the substances and substance mixtures through a flame protection filter into the interior of a housing or an installation. Penetrating substances and substance mixtures of this kind can lead to soiling, icing and other malfunctions. In case of an explosion, the at least one protective device is preferably actuated by the pressure wave of the explosion and is permeable to the explosion gas.

Protective devices can be formed by coatings of the material of one or all filter layers, by the geometric configuration of an outlet orifice or outlet channel downstream of the flame protection filter and by devices which are actively actuated or which operate passively.

The mechanical stability of the flame protection filter according to the invention allows these protective devices to be directly fastened to and/or integrated in the flame protection filter.

In a further embodiment, the flame protection filter according to the invention can be constructed annularly in order to prevent the formation of a temperature hotspot in the flow through the center of the flame protection filter.

Typical areas of use of flame protection filters according to the invention and arrangements of flame protection filters are devices such as switch cabinets, for example, in which high temperatures can occur and in which there are, in addition, ignition sources such as electrical switches.

The flame protection filter according to the invention and an arrangement can also be used as a filter for filtration of media. Media can be gases, gas mixtures, aerosols, dusts, mists, vapors, dispersions, suspensions, bulk materials, mixtures of bulk material or liquids.

A further use of a flame protection filter according to the invention or of an arrangement consists in conducting gases or gas mixtures through the flame protection filters or through the arrangement. Accordingly, there can be a use for filtration of air or air mixtures in air conditioning systems, for example.

There are further possibilities for use in the field of construction of horns and acoustic signal devices. Sound sources as potential ignition sources can be shielded from an environment by means of the flame protection filters according to the invention, and the emitted sound can effectively pass through the flame protection filter as pressure wave.

At least one flame protection filter can advantageously be used in a housing which is encapsulated in a pressure-tight manner.

BRIEF DESCRIPTION OF THE DRAWINGS

The invention will be described in more detail in the following referring to embodiment examples and illustrations. The drawings show.

DETAILED DESCRIPTION OF EMBODIMENTS OF THE INVENTION

Figure 1:
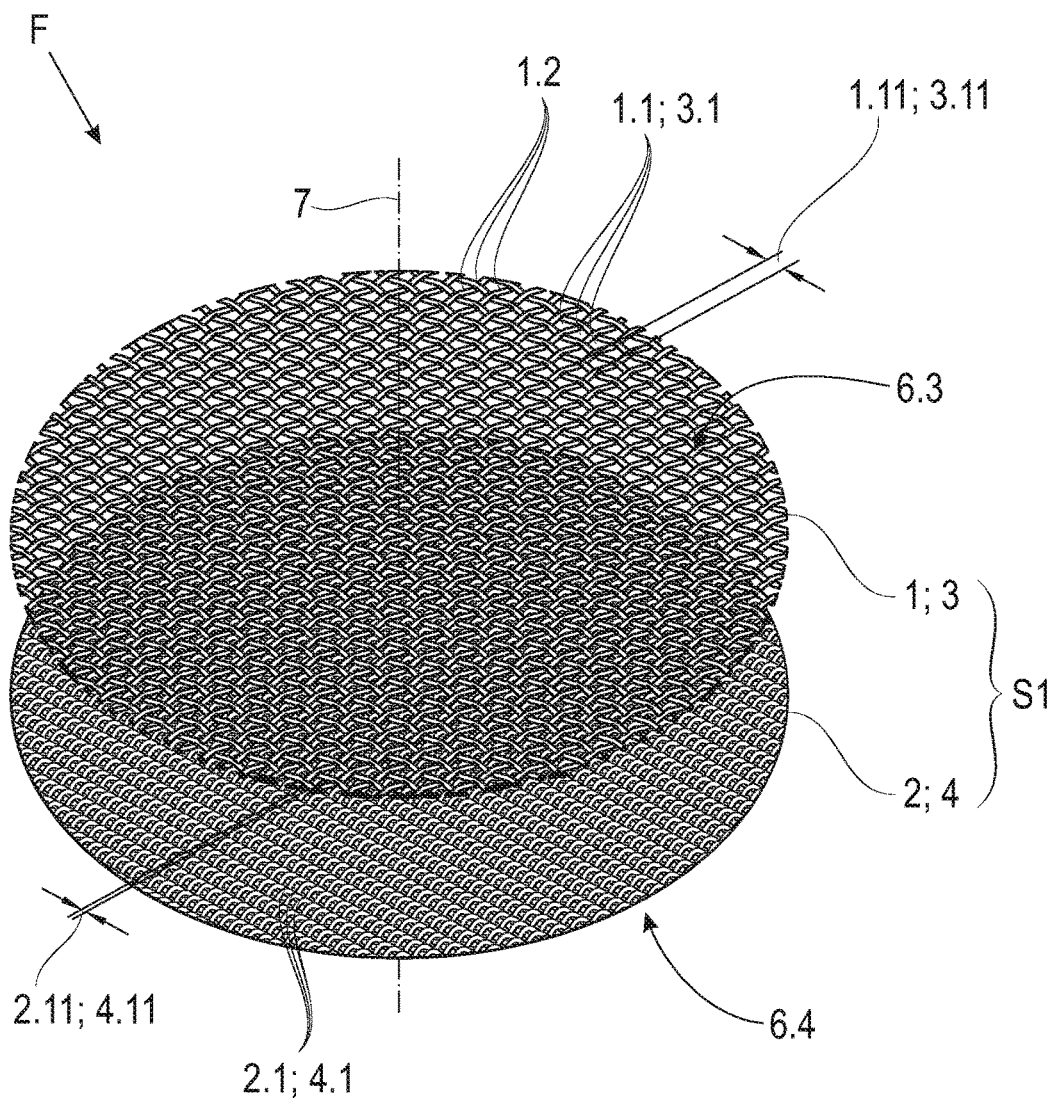
FIG. 1 a schematic view of a first embodiment example of a flame protection filter according to the invention in an exploded view.

The following embodiment examples are shown schematically and are not true to scale. Identical reference numerals in the different drawings denote identical elements unless otherwise stated.

An essential element of a first embodiment example of a flame protection filter F according to the invention which is shown schematically in FIG. 1 is a first layer sequence S1 comprising a first filter layer 1 and a second filter layer 2 which are arranged one above the other along a common axis 7.

The first filter layer 1 is formed of a woven wire fabric, has a round cross-sectional surface area and has first openings 1.1. The first openings 1.1 are defined by webs 1.2, are identical in size and identically shaped and have a first opening width 1.11 of 400 µm as clear width between two webs 1.2 extending parallel to one another.

The second filter layer 2 is likewise formed of a woven wire fabric. This woven wire fabric is a braid in linen weave and has second openings 2.1 with a second opening width 2.11 of 150 µm.

The first filter layer 1 has a free lateral surface 6.3 and is designated hereinafter as first end filter layer 3. The second filter layer 2 has a free lateral surface 6.4 and is designated hereinafter as second end filter layer 4.

Correspondingly, the openings and opening widths of the first end filter layer 3 will be designated hereinafter as first end filter openings 3.1 and first end filter opening widths 3.11, respectively.

Accordingly, the openings and opening widths of the second end filter layer 4 are designated hereinafter as second end filter openings 4.1 and second end filter opening widths 4.11, respectively.

Figure 2:
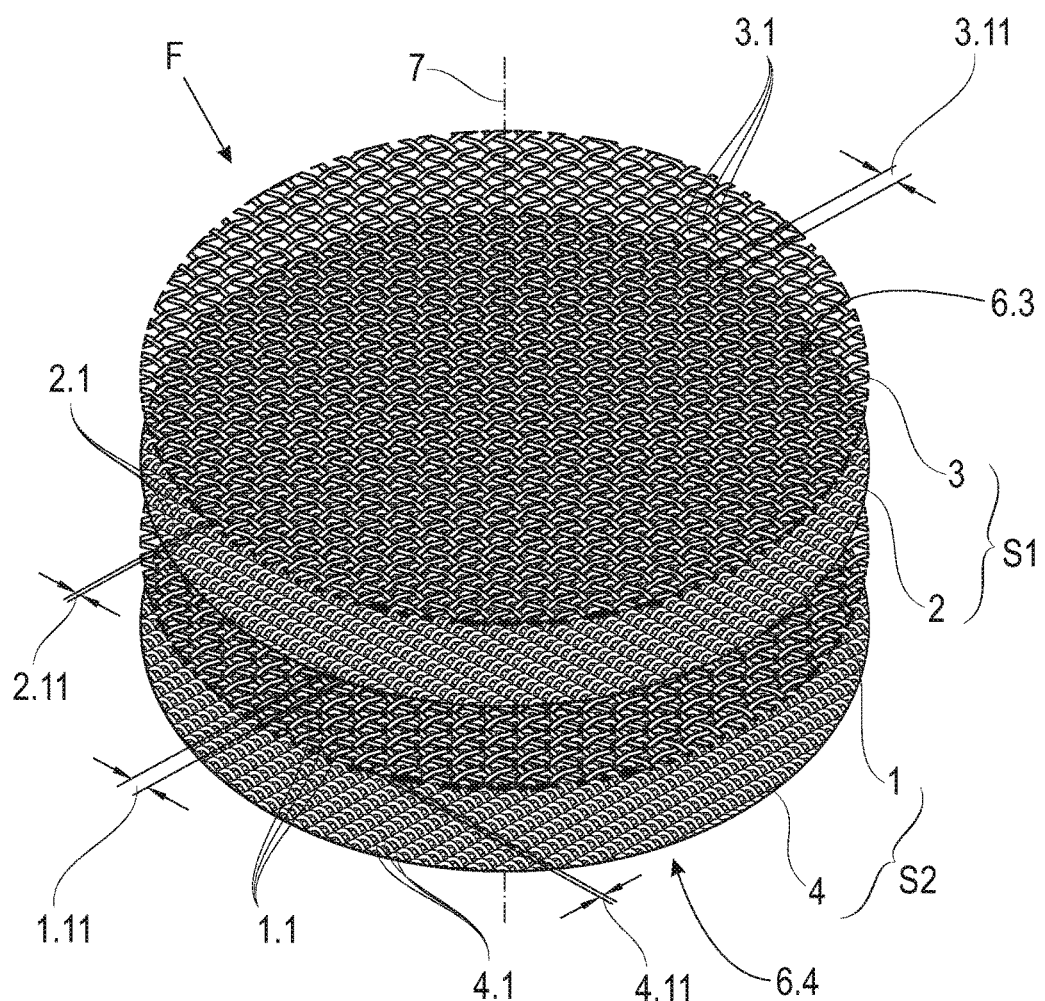
FIG. 2 a schematic view of a second embodiment example of a flame protection filter according to the invention in an exploded view.

Flame protection filters F according to the invention can be composed of a quantity n=2 of layer sequences S1 and S2 as is shown schematically in FIG. 2.

FIG. 2 schematically shows a second embodiment example of a flame protection filter F in which a first layer sequence S1 and a second layer sequence S2 are arranged one above the other. The construction of the first layer sequence S1 and second layer sequence S2 corresponds to the basic construction described referring to FIG. 1.

The first layer sequence S1 is formed by the first end filter layer 3, which has a free lateral surface 6.3, first end filter openings 3.1 with a first end filter opening width 3.11 (see FIG. 1), and by the second filter layer 2 which has second openings 2.1 with a second opening width 2.11 (see FIG. 1).

The second layer sequence S2 is formed by the first filter layer 1 of the second layer sequence S2 which has first openings 1.1 with a first opening width 1.11 (see also FIG. 1) and the second end filter layer 4 which has a free lateral surface 6.4 and second end filter openings 4.1 with a second end filter opening width 4.11 (see also FIG. 1).

The material of filter layers 1 and 2 and of end filter layers 3 and 4 is stainless steel wire.

In further embodiments of the flame protection filter F according to the invention, the material of filter layers 1 and 2 and of end filter layers 3 and 4 can be, independently from one another, metals, metal alloys, plastics, ceramics or composite materials. In further embodiments, other first opening widths 1.11 and second opening widths 2.11, e.g., tight meshes, and other first end opening widths 3.11 and second end filter opening widths 4.11 can be provided.

The first opening width 1.11 is smaller than the first end filter opening width 3.11.

Figure 3:
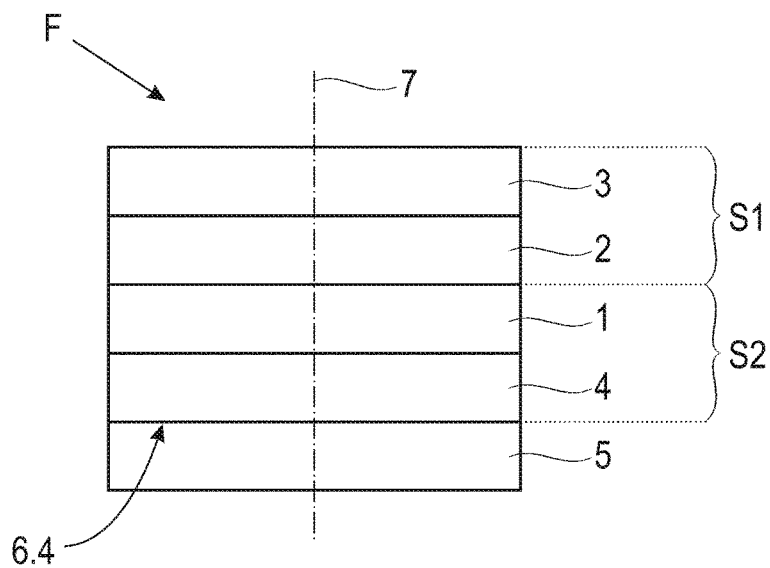
FIG. 3 a schematic view of a third embodiment example of a flame protection filter according to the invention in a schematic side view.

A third embodiment example of a flame protection filter F according to the invention is shown in FIG. 3 as a schematic side view for the sake of better clarity. The flame protection filter F shown in the figure comprises first layer sequence S1 and second layer sequence S2 arranged one above the other as was described referring to FIG. 2. The free lateral surfaces 6.4 of the second end filter layer 4 is covered by a further filter layer 5 which has further openings 5.1 with a further opening width 5.11 (see FIG. 5). The further opening width 5.11 is larger than the second end filter opening width 4.11.

The material of the further filter layer 5 is a woven wire fabric of stainless steel wire.

Figure 4:
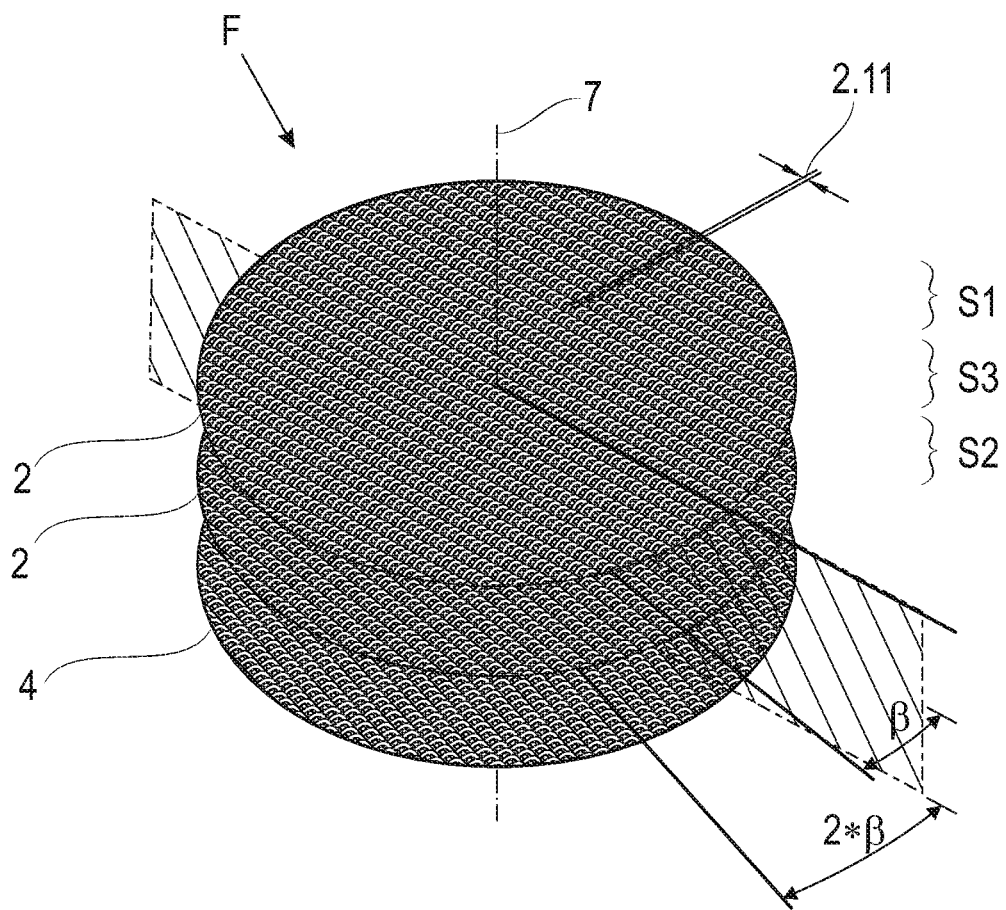
FIG. 4 a schematic view of a fourth embodiment example of a flame protection filter according to the invention in an exploded view, wherein only the second filter layers and the second end filter layer are shown.

A fourth embodiment example of a flame protection filter F according to the invention is shown schematically in FIG. 4. In contrast to the embodiment example according to FIG. 2, a third layer sequence S3 has been inserted between layer sequences S1 and S2 so that flame protection filter F comprises three layer sequences S1, S2 and S3. For the sake of better clarity, only the second filter layers 2 and the second end filter layer 4 of the flame protection filter F are shown in FIG. 4. The second filter layers 2 and the second end filter layer 4 are again formed of woven wire fabrics in the form of braids in linen weave which are each arranged so as to be rotated by an angle β of 10° relative to a second filter layer 2 which is arranged adjacently according to FIG. 4 and relative to a second end filter layer 4 which is arranged adjacently according to FIG. 4. Rotation is carried out in a constant direction such that the second filter layer 2 shown in the middle is arranged so as to be rotated by angle β relative to the upper second filter layer 2 and the bottommost second end filter layer 4 is arranged so as to be rotated by angle 2*β relative to the uppermost second filter layer 2.

In further embodiments of the flame protection filter F, a different angle β can be selected.

When a gas, particularly an explosion gas, flows through the flame protection filter F, an additional directional change of the flowing explosion gas is caused by the small second opening widths 2.11 and the rotation of the second filter layers 2 and second end filter layer 4. Further, the distance through which the explosion gas flows is lengthened, which reinforces the separation of a pressure wave 11 from a flame front 12 (see FIG. 8).

Figure 5:
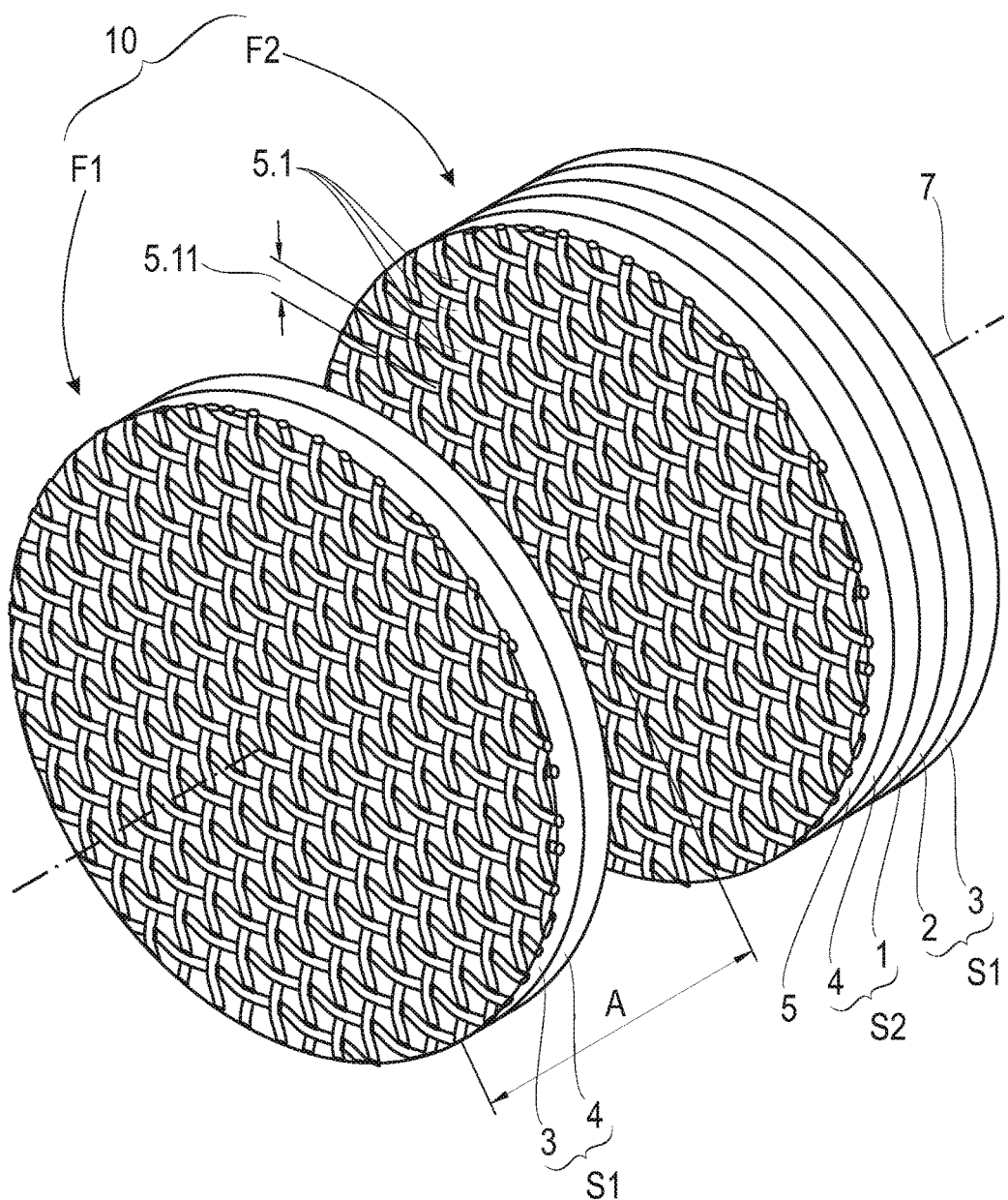
FIG. 5 a first embodiment example of an arrangement of a first flame protection filter and a second flame protection filter.

A first embodiment example of an arrangement 10 of a first flame protection filter F1 and of a second flame protection filter F2 along a common axis 7 is shown in FIG. 5. The common axis 7 is perpendicular to the filter layers of the first flame protection filter F1 and the second flame protection filter F2 and runs through the area centroids thereof. The first flame protection filter F1 corresponds to the construction shown in FIG. 1 and comprises a first layer sequence S1 with a first end filter layer 3 and a second end filter layer 4. The second flame protection filter F2 corresponds to the construction shown in FIG. 3 and comprises a first layer sequence S1 and a second layer sequence S2. The first layer sequence S1 of the second flame protection filter F2 is formed by the first end filter layer 3 and the second filter layer 2. The second layer sequence S2 of the second flame protection filter F2 is formed by the first filter layer 1 and the second end filter layer 4. A further filter layer 5 which has further opening 5.1 with a further opening width 5.11 (see also FIG. 3) is arranged on the free lateral surface 6.4 of the second end filter layer 4. The first flame protection filter F1 and the second flame protection filter F2 are arranged with a distance A between the second end filter layer 4 of the first flame protection filter F1 and the further filter layer 5 of the second flame protection filter F2.

Figure 6:
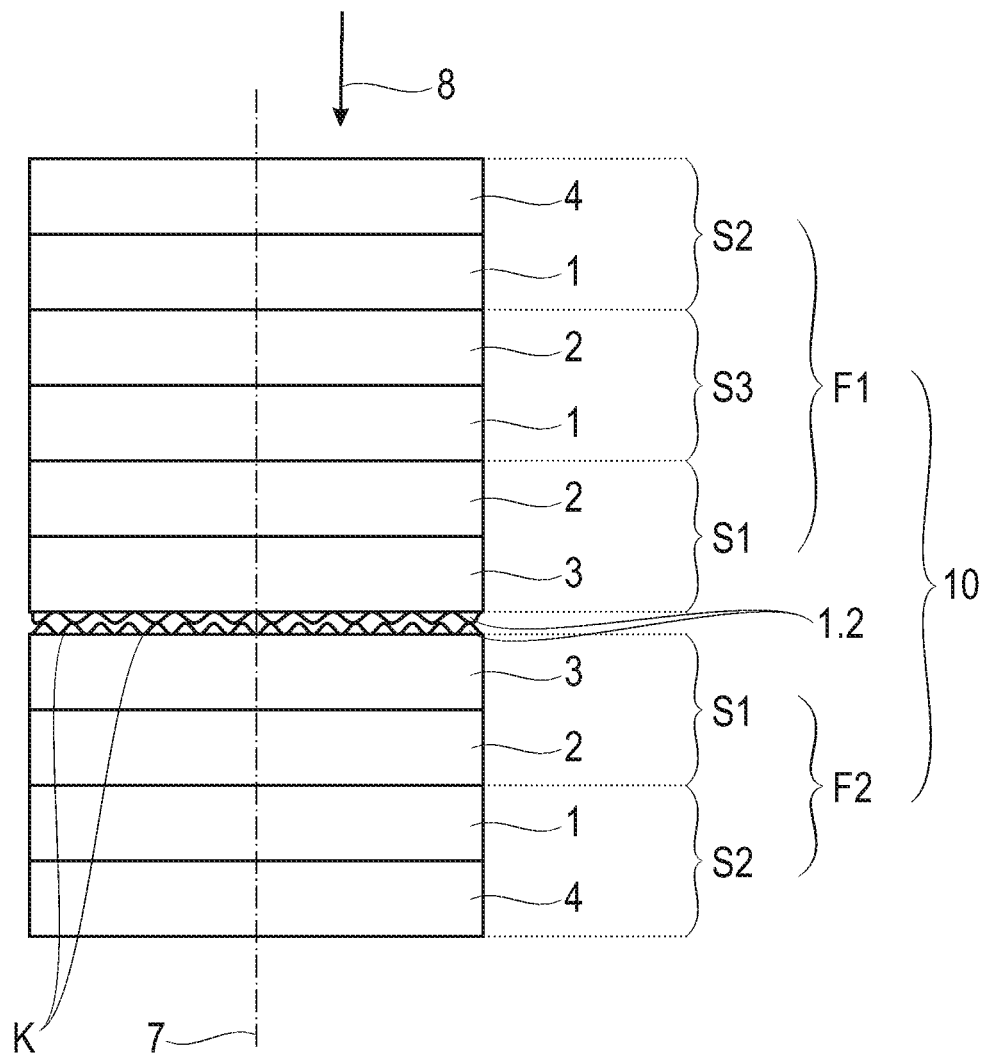
FIG. 6 a second embodiment example of an arrangement of two flame protection filters according to the invention in a schematic side view.

FIG. 6 shows a second embodiment example of an arrangement 10 of two flame protection filters F1, F2 according to the invention in a schematic side view. The first flame protection filter F1 corresponds to the construction shown in FIG. 4 and comprises three layer sequences S1, S3 and S2. Above a first end filter layer 3 and a second filter layer 2 of the first layer sequence S1, there are a first filter layer 1 and a second filter layer 2 of the third layer sequence S3 and, above this, a first filter layer 1 and a second end filter layer 4 of the second layer sequence S2. The three layer sequences S1, S3 and S2 are fixedly connected to one another by a sintering process.

The second flame protection filter F2 corresponds to the construction shown in FIG. 2 and is formed by two layer sequences S1 and S2. The first layer sequence S1 of the second flame protection filter F2 comprises a first end filter layer 3 and a second filter layer 2. The second layer sequence S2 of the second flame protection filter F2 comprises a first filter layer 1 and a second end filter layer 4. The first flame protection filter F1 and the second flame protection filter F2 are arranged along the common axis 7 and are in direct contact with one another via their first end filter layers 3. The two first end filter layers 3 are formed of a woven wire fabric, the webs 1.2 of which result in elevations and depressions in some areas on the respective first end filter layer 3 as a result of the weaving method used to produce it. The area along which the two first end filter layers 3 touch each other and the elevations and depressions are shown in an enlarged not-true-to-scale manner in FIG. 6. The first flame protection filter F1 and second flame protection filter F2 are in direct contact with one another such that at least some of the elevations touch one another at their highest areas, where contact surfaces K are formed between the first flame protection filter F1 and the second flame protection filter F2. A heat conduction is made possible between the first flame protection filter F1 and the second flame protection filter F2 via contact surfaces K. At the same time, a space through which an explosion gas flows in a relief direction 8 is created by the large first end filter opening widths 3.11 and a diameter of the material of the first end filter layers 3. In so doing, the explosion gas cools extensively, which substantially facilitates an extinction of any flames still present.

Figure 7:
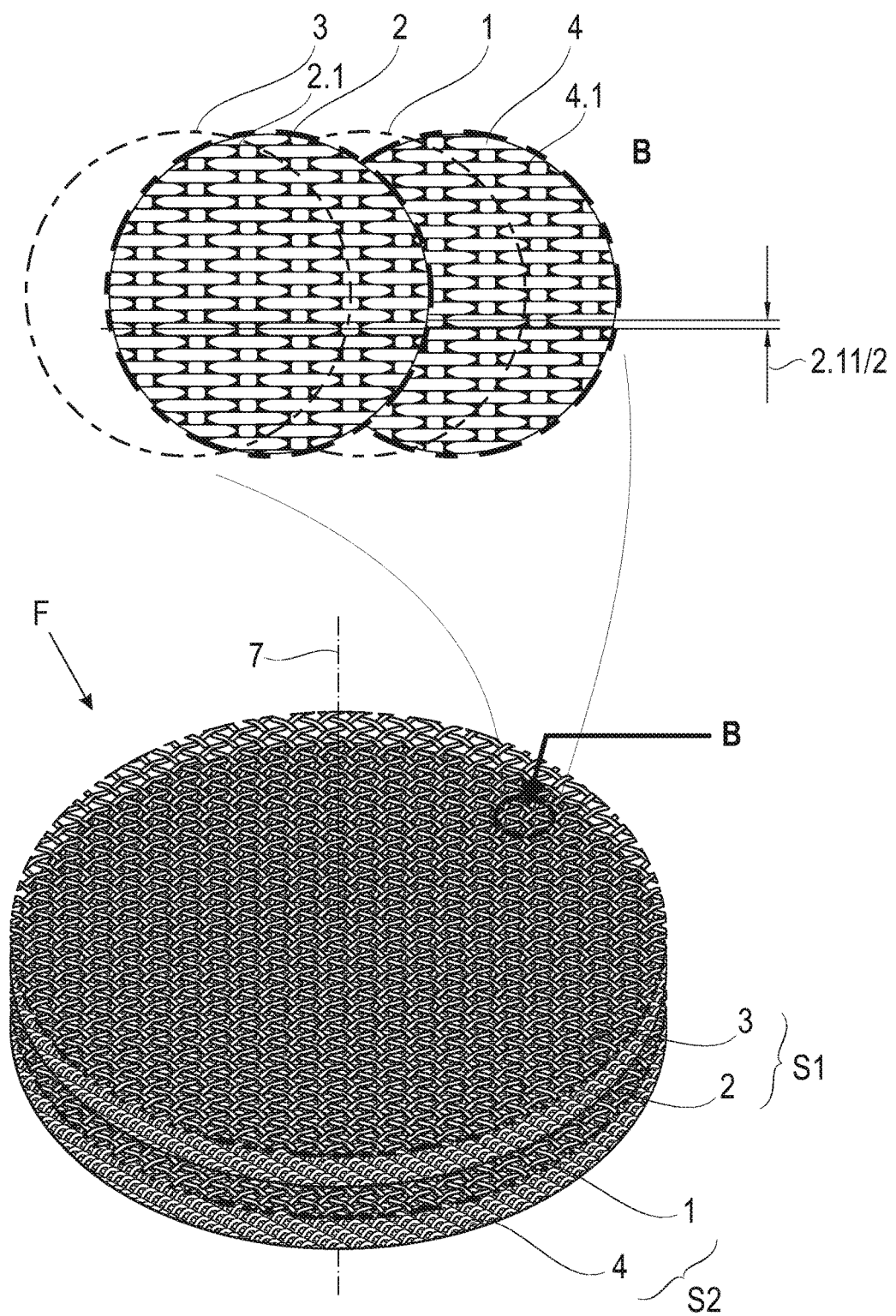
FIG. 7 a schematic view of a fifth example of a flame protection filter according to the invention with an offset of the second filter layer and second end filter layer, and FIG. 8 an embodiment example of a pressure-relieved housing.

In a fifth embodiment example of a flame protection filter F according to the invention shown in FIG. 7, a first layer sequence S1 with a first end filter layer 3 and a second filter layer 2 and a second layer sequence S2 with a first filter layer 1 and with a second end filter layer 4 are arranged one on top of the other. A second filter layer 2 and the second end filter layer 4 are arranged so as to be offset relative to one another by approximately one half of the second opening width 2.11 (see detail B) so that the second openings 2.1 and the second end filter openings 4.1 are not congruently one above the other. The first end filter layer 3 and the first filter layer 1 are merely suggested in detail B for a clearer illustration.

Figure 8:
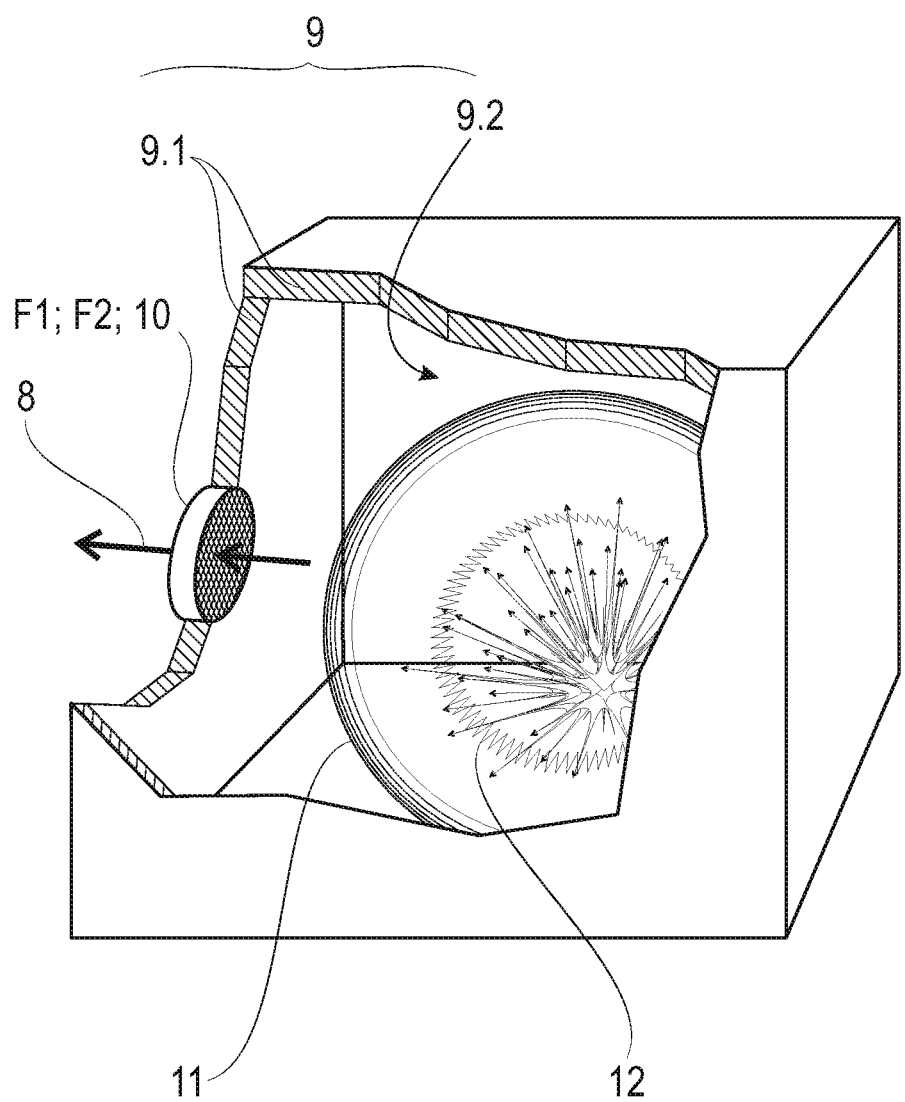

FIG. 8 shows a pressure-relieved housing 9 in a partial sectional view containing an arrangement 10 in one of its housing walls 9.1 as is described referring to FIG. 6. The second end filter layer 4 of the second flame protection filter F2 (see FIG. 6) faces a housing interior 9.2, while the second end filter layer 4 of the first flame protection filter F1 faces an environment of housing 9. The housing wall 9.1 is spanned by arrangement 10.

An explosion which has just taken place is shown in the housing interior 9.2 in a highly simplified manner. An explosion gas with a pressure wave 11 and a flame front 12 propagates on all sides proceeding from an explosion center.

An increase in the pressure values and a positive pressure are brought about in the housing interior 9.2 as a result of the explosion. As a result of the overpressure in the housing interior 9.2, a portion of the explosion gas flows in relief direction 8 through the arrangement 10 out of the housing 9.

The processes in arrangement 10 are described in a simplified manner referring to FIGS. 6 and 8.

The pressure wave 11 and the flame front 12 impinge on arrangement 10, and the magnitude of the relief surface, i.e., the cross-sectional surface area of arrangement 10 that is freely accessible to the explosion gas, in conjunction with the pressure values prevailing in the housing interior 9.2 essentially determines the volume of the explosion gas which passes through arrangement 10 per unit of time (volume flow). Even as it passes through the second end filter layer 4 of the first flame protection filter F1, the explosion gas undergoes directional changes and turbulences because of the small second end filter opening width 4.11 and, above all, because of the opaque configuration and then arrives at the first filter layer 1. The same thing is brought about by the subsequent layer sequences S3 and S1. A cooling of the explosion gas and an increasing separation of pressure wave 11 and flame front 12 are achieved through the turbulences and the intensive contact of the explosion gas with the materials of the first flame protection filter F1. After it flows through the second filter layer 2 of the first flame protection filter F1, a further sharp cooling of the explosion gas takes place in the area where the first end filter layers 3 of the first flame protection filter F1 and second flame protection filter F2 are in direct contact with each other. The processes outlined above repeat analogously while the explosion gas continues to flow in relief direction 8 through the second flame protection filter F2. As a result of the negative pressure which now exists in housing 9, the escaped gas is compulsorily pulled into arrangement 10 again so that a temperature which is so high that an ignition could come about inside layer sequences S2 or S3 could still exist in the first flame protection filter F1. As a result of the selected arrangement 10 in which two flame protection filters F1 and F2 are to be arranged one behind the other, it is ensured that a flame front 12 cannot exit the housing through the second flame protection filter F2 as soon as the layer sequence S1 of the first flame protection filter F1 has a temperature less than the ignition temperature.

LIST OF REFERENCE CHARACTERS flame protection filter
F1 first flame protection filter
F2 second flame protection filter
S1 first layer sequence
S2 second layer sequence
S3 third layer sequence
1 first filter layer
1.1 first opening
1.11 first opening width
1.2 web
2 second filter layer
2.1 second opening
2.11 second opening width
3 first end filter layer
3.1 first end filter opening
3.11 first end filter opening width
4 second end filter layer
4.1 second end filter opening
4.11 second end filter opening width
5 further filter layer 5.1 further opening
5.11 further opening width
6.3 free lateral surface (of the first end filter layer 3)
6.4 free lateral surface (of the second end filter layer 4)
7 common axis
8 relief direction
9 housing
9.1 housing wall
9.2 housing interior
10 arrangement (of flame protection filters F1 and F2)
11 pressure wave
12 flame front
A distance
β angle
K contact surface

What is claimed is:

1. A flame protection filter, wherein the filter comprises a number k of layer sequences, where k=1, . . . , n, each of the layer sequences comprising filter layers arranged one on top of the other with a common axis, and wherein every layer sequence comprises a first filter layer formed by a first grating and a second filter layer parallel to the first filter layer and formed by a second grating,
the first grating of the first filter layer comprising a first opening width and a first imaginary perpendicular projection of the first filter layer on a projection plane extending parallel thereto representing a lattice structure, and
the second grating of the second filter layer comprising a second opening width and a second imaginary perpendicular projection of the second filter layer on a projection plane extending parallel thereto representing a closed surface area, a flow direction of a gas flow which impinges substantially perpendicularly on the second filter layer being compulsorily deflected.

2. The filter of claim 1, wherein the first filter layer having a free lateral surface is a first end filter layer having a first end filter opening width and the second filter layer having a free lateral surface is a second end filter layer with a second end filter opening width.

3. The filter of claim 2, wherein the first end filter layer and/or the second end filter layer is covered by a further filter layer formed by a further grating with a further opening width.

4. The filter of claim 3, wherein the further opening width is the largest of all of the opening widths.

5. The filter of claim 3, wherein the further opening width is equal to the first end filter opening width.

6. The filter of claim 3, wherein the further opening width is equal to the first opening width.

7. The filter of claim 3, wherein the further opening width is equal to the second end filter opening width.

8. The filter of claim 3, wherein the further opening width is equal to the second opening width.

9. The filter of claim 1, wherein a material of the grating is selected from metals, metal alloys, plastics, ceramics, composite materials.

10. The filter of claim 1, wherein the second grating of the second filter layer is a woven fabric in the form of a braid.

11. The filter of claim 10, wherein the braid is a braid with linen weave.

12. The filter of claim 10, wherein the braid is a braid with twill weave.

13. The filter of claim 1, wherein with a number n of existing layer sequences, where n is greater than 1, at least two adjacently arranged second filter layers are arranged so as to be offset with respect to one another.

14. The filter of claim 13, wherein that at least two adjacently arranged second filter layers are arranged so as to be rotated relative to one another by an angle (β) selected from an angular range of greater than 0° up to and including 90° and/or the second filter layers are arranged so as to be displaced by a distance relative to one another in a direction facing parallel to lateral surfaces of the first and second filter layers.

15. An arrangement of at least two flame protection filters according to claim 1, wherein all of the flame protection filters are arranged along the common axis.

16. The arrangement of claim 15, wherein at least two adjacently arranged flame protection filters directly contact one another.

17. A method of preventing an ignition transmission and relieving pressure after an increase in gas pressure, wherein the method comprises employing the filter of claim 1.

18. A method of filtering media, wherein the method comprises employing as a filter for filtering media the filter of claim 1.

19. A method of shielding sound sources in acoustic signal devices as potential ignition sources from the environment, wherein the method comprises employing the filter of claim 1, emitted sound passing through the filter as pressure wave.

20. A housing which is encapsulated in a pressure-tight manner, wherein the housing comprises at least one filter according to claim 1.

* * * * *

UNITED STATES PATENT AND TRADEMARK OFFICE
CERTIFICATE OF CORRECTION

PATENT NO. : 10,537,760 B2
APPLICATION NO. : 15/524688
DATED : January 21, 2020
INVENTOR(S) : Barz It is certified that error appears in the above-identified patent and that said Letters Patent is hereby corrected as shown below:

On the Title Page

Item (12), should read:
Barz et al.

Item (72), should read:
Ines Barz, Apolda (DE);
Thorsten Arnhold, Pfedelbach (DE)

Signed and Sealed this
Twenty-sixth Day of January, 2021

Drew Hirshfeld
*Performing the Functions and Duties of the*
*Under Secretary of Commerce for Intellectual Property and*
*Director of the United States Patent and Trademark Office*